United States Patent [19]
Larson

[11] Patent Number: 5,909,889
[45] Date of Patent: Jun. 8, 1999

[54] VEHICLES HAVING DIFFERENT-SIZED WHEELS AND HUB ECCENTRICITIES

[76] Inventor: Warren H. Larson, 3450 Brunswick Ave. South, St. Louis Park, Minn. 55416

[21] Appl. No.: 08/874,853

[22] Filed: Jun. 13, 1997

[51] Int. Cl.$^6$ ..................................................... B62K 17/00
[52] U.S. Cl. ................................................ 280/229; 280/282
[58] Field of Search ................................... 280/229, 220, 280/221, 261, 259, 282, 1.191

[56] References Cited

U.S. PATENT DOCUMENTS

| | | |
|---|---|---|
| 423,051 | 3/1890 | Haven . |
| 1,223,949 | 4/1917 | Flagg ....................... 280/229 |
| 1,449,163 | 3/1923 | Brandes ................... 280/229 |
| 1,570,528 | 1/1926 | Schaffner ................ 280/229 |
| 1,759,740 | 5/1930 | Foltz ....................... 280/229 |
| 2,555,480 | 6/1951 | Fischer . |
| 3,152,813 | 10/1964 | Brown .................... 280/229 |
| 3,292,946 | 12/1966 | Melson ................... 280/229 |
| 3,371,944 | 3/1968 | Daniels . |
| 3,372,766 | 3/1968 | Lifferth .................. 280/229 |
| 3,372,768 | 3/1968 | Wresch ................... 280/229 |
| 3,514,117 | 5/1970 | Olsen ..................... 280/229 |
| 3,799,581 | 3/1974 | Munn . |
| 4,162,084 | 7/1979 | Mikina . |
| 4,518,176 | 5/1985 | Hegedüs . |
| 4,588,232 | 5/1986 | Kim et al. . |
| 4,602,822 | 7/1986 | Kim et al. . |
| 4,755,005 | 7/1988 | Tsai . |
| 4,917,394 | 4/1990 | Lin . |
| 5,249,847 | 10/1993 | Lee . |
| 5,553,878 | 9/1996 | Davignon et al. . |

*Primary Examiner*—Anne Marie Boehler
*Attorney, Agent, or Firm*—Richard C. Litman

[57] ABSTRACT

Vehicles having wheels of different diameter sizes that are mounted with different eccentricities relative to each other. The twofold variability afforded by the wheel diameter and eccentricity disparities allows a vast array of possible two, three and four wheel vehicles, each having unique oscillatory patterns. A bicycle embodiment has differently-sized front and back wheels that are eccentrically mounted on their respective axle hubs by a differing offset amount with respect to each other. A tricycle embodiment has a front wheel with a different diameter than that of the back wheels, and the hub eccentricities of both wheels also differ with respect to each other. The hubs are arranged on an axle so as to be 180° out of phase relative to each other. One possible four wheel embodiment has front wheels with a different diameter than that of the back wheels, and the hub eccentricity of the front wheels also differs from that of the back wheels. Both sets of hubs are arranged so as to be 180° out of phase relative to each other.

3 Claims, 3 Drawing Sheets

VEHICLES HAVING DIFFERENT-SIZED WHEELS AND HUB ECCENTRICITIES

BACKGROUND OF THE INVENTION

1. Field of the Invention

The present invention relates to wheeled vehicles, including bicycles, tricycles and various four wheel vehicles, and more specifically to such vehicles having different-sized wheels and hub eccentricities.

2. Description of Related Art

Many inventions and patents have described bicycles, and other wheeled vehicles propelled by the human body, having eccentric wheel arrangements and apparatuses for adjusting wheel eccentricity. Wheel eccentricity promotes an oscillatory motion in vehicles, making the ride more entertaining and enhancing the vehicle's exercise intensity level.

Several related inventions and patents involve the eccentric wheel itself. U.S. Pat. No. 423,051 discloses a wheel having an axle designed to move within and independent of the rotation of the wheel. The wheel of U.S. Pat. No. 3,371,944 includes a center hub having an axle whose position relative to the axis of the wheel can be varied as desired, while in motion. Furthermore, U.S. Pat. No. 4,917,394 discloses an eccentric rear wheel for a bicycle, where a slidable block-pinion arrangement causes the wheel to rotate eccentrically. Also of note, a pair of spring-biased pins engages a block to facilitate movement along an axle-supporting track in the eccentric bicycle wheel of U.S. Pat. No. 5,249,847.

Another group of related U.S. patents involves means for adjusting the hub and axle of bicycle wheels to create an eccentric arrangement thereof. U.S. Pat. No. 3,799,581, for example, discloses a bicycle wheel hub having an adjustable eccentric mounting. The apparatuses of U.S. Pat. Nos. 4,588,232 and 4,602,822 enable the eccentric varying of a bicycle wheel axle and shaft, respectively. Similarly, U.S. Pat. No. 4,755,005 discloses axle-varying means for an eccentric wheel.

While these inventions and patents involve wheels, axles and other individual bicycle components, other related U.S. patents describe entire bicycles, or other vehicles, having eccentrically arranged wheel hubs. The wheeled amusement and exercise vehicle of U.S. Pat. No. 2,555,480 has, alternatively, three or four eccentrically mounted wheels and other rearrangeable components, which provide a bouncing, undulatory, up and down movement while riding. Additionally, the hub-axle-wheel arrangement of the vehicle of '480 can be modified so as to superimpose a regularly repeating side-to-side swaying of the vehicle on its up and down movement.

U.S. Pat. No. 3,292,946 discloses a bicycle having front and rear wheels eccentrically mounted by a differing amount with respect to each other. The difference in wheel eccentricities provides a modulation effect with an up and down motion that simulates the action of a forward moving see-saw or a bucking bronco. However, the bicycle of '946 is a toy vehicle, providing an amusing and entertaining ride for children.

The exercise bicycle of U.S. Pat. No. 4,162,084 features wheels having hub eccentricities that provide a variety of compound oscillatory motions of the bicycle frame and rider. In doing so, the bicycle of '084 more effectively exercises the body of the rider, subjecting it to accelerations similar to those experienced in riding a horse. Specifically, a brisk gallop sensation is created when the wheel eccentricities are in phase with each other, while out-of-phase wheel eccentricities produce a bucking bronco simulation.

U.S. Pat. No. 4,518,176 discloses a crank-operated vehicle with eccentrically mounted wheels and a chassis divided into a front and rear sections pivoted together. The crank driving system of the vehicle of '176 comprises a pair of driving wheels attached with opposite eccentricity to a common driving shaft that supports one of the chassis sections. The axis of the driving shaft connecting the wheels intersects a theoretical line passing through the center of the driving wheels at an acute angle. One driving wheel is fixed non-rotatably to the shaft while the other one is attached for free rotation relative to the shaft.

The adjustable riding toy of U.S. Pat. No. 5,553,878 has bicycle and tricycle embodiments. At least one wave ride wheel, eccentrically mounted, enables an up and down ride on the vehicle, while synchronized eccentrically mounted wave ride wheels creates a side to side wobble of the riding toy.

None of the above inventions and patents, taken either singly or in combination, is seen to describe the instant invention as claimed.

SUMMARY OF THE INVENTION

The present invention, in all of its embodiments, improves upon the related art involving vehicles that feature eccentrically-mounted wheels to produce oscillatory sensations for a rider. The vehicles of the present invention incorporate wheels of different diameter sizes that are mounted with different eccentricities relative to each other. The twofold variability afforded by the wheel diameter and eccentricity disparities allows a vast array of possible two, three and four wheel vehicles, each having unique oscillatory patterns.

The bicycle embodiment of the present invention comprises a conventional bicycle frame having a standard seat, handlebars, front and back fork tubes and a peddle-sprocket-chain assembly. The fork tubes operably engage differently-sized front and back wheels, each having different outside diameters, and each eccentrically mounted their respective axle hubs by a differing offset amount with respect to each other. The disparity in wheel size introduces a second variable, in addition to their being eccentrically mounted by differing amounts, further enhancing the oscillatory sensation experienced by a rider. The difference in diameter dimensions between the front and back wheels, and the difference in eccentricity offset distances between the hubs determines the extent of the oscillatory sensations produced.

The simulative nature of the bicycle allows a rider to experience and enjoy diverse conditions, including downhill and uphill riding, without requiring the presence of the actual geographical features that normally account for these conditions. Thus, the bicycle also has a beneficial therapeutic effect, for rehabilitating and exercising back muscles, leg muscles and muscles associated with joints of the body.

The tricycle embodiment of the present invention features a conventional frame, with a seat, handlebars, a front fork tube, a pedal assembly and a bifurcated axle support tube. The front wheel has a different diameter than that of the back wheels, and the hub eccentricities of both wheels also differ with respect to each other. Furthermore, the hubs are arranged on an axle so as to be 180° out of phase relative to each other, further enhancing the oscillatory sensation experienced by a rider of tricycle, and making it an amusing toy for children.

One possible four wheel embodiment of the present invention is designed for an infant, having an enclosed carriage, a cover and a handle. The front wheels have a different diameter than that of the back wheels, and the hub eccentricity of the front wheels also differs from that of the back wheels. Both sets of hubs are arranged so as to be 180° out of phase relative to each other, enhancing the oscillatory sensation experienced by an infant passenger in the enclosed carriage that ultimately produces a lolling, pacifying effect.

Accordingly, it is a principal object of the invention to provide a vehicle having wheels of different diameter sizes that are mounted with different eccentricities relative to each other, for ultimately producing a more pronounced oscillatory sensation.

It is another object of the invention to simulate diverse conditions, including downhill and uphill riding, without requiring the presence of the actual geographical features that normally account for these conditions.

It is a further object of the invention to provide an amusing toy for children.

Still another object of the invention is to provide a carriage for infants whose wheel-axle arrangement produces a lolling, pacifying effect with a smooth ride.

It is also an object of the invention to provide improved elements and arrangements thereof in an apparatus for the purposes described which is inexpensive, dependable and fully effective in accomplishing its intended purposes. These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
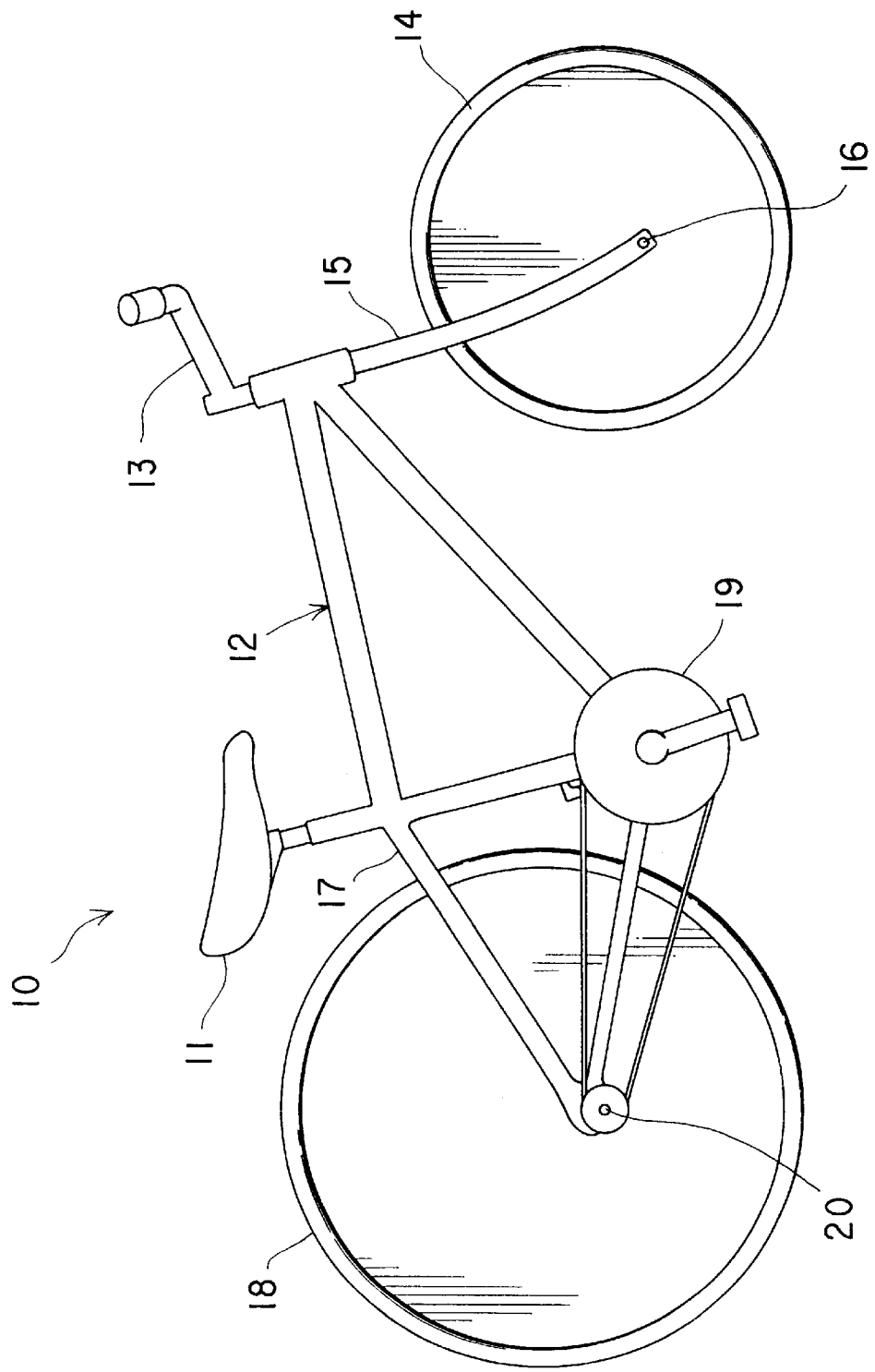
FIG. 1 is a side elevational view of the bicycle embodiment of the present invention.

The bicycle embodiment of the present invention, as referenced by 10, is illustrated in FIG. 1. A substantially conventional bicycle frame 12 has a standard seat 11, handlebars 13, front and back fork tubes 15,17 and a peddle-sprocket-chain assembly 19. Fork tubes 15,17 operably engage differently-sized front and back wheels 14,18, respectively, each having different outside diameters. Also, wheels 14,18 are eccentrically mounted on front and back wheel axle hubs 16,20, respectively, by a differing offset amount with respect to each other. Preferably, wheels 14,18 are one-piece molded plastic, or cast metal, with offset hubs 16,20 pre-formed therein.

The disparity in size of wheels 14,18 introduces a second variable, in addition to their being eccentrically mounted by differing amounts, further enhancing the oscillatory sensation experienced by a rider of bicycle 10. With hubs 16,20 initially in phase, a rider must travel a significant distance on bicycle 10 to return to the original in-phase position, as both differently-sized wheels 14,18 and differently-offset eccentric hubs 16,20 work in concert to produce a more pronounced up and down motion simulation. The difference in diameter dimensions between front and back wheels 14,18, and the difference in eccentricity offset distances between hubs 16,20 determines the extent of the oscillatory sensations produced.

The simulative nature of bicycle 10 allows a rider to experience and enjoy diverse conditions without requiring the presence of the actual geographical features that normally account for these conditions. At one position of wheels 14,18 and axle hubs 16,20 in the course of one full revolution, a rider experiences the sensation of coasting downhill, without needing to exert his or her leg muscles to propel bicycle 10. At another position, the rider experiences the sensation of riding uphill, and must exert his or her leg muscles accordingly. Thus, bicycle 10 also has a beneficial therapeutic effect, for rehabilitating and exercising back muscles, leg muscles and muscles associated with joints of the body. The twofold variability afforded by the wheel diameter and eccentricity disparities allows a vast array of possible individual bicycles 10, each having unique oscillatory patterns.

Figure 2:
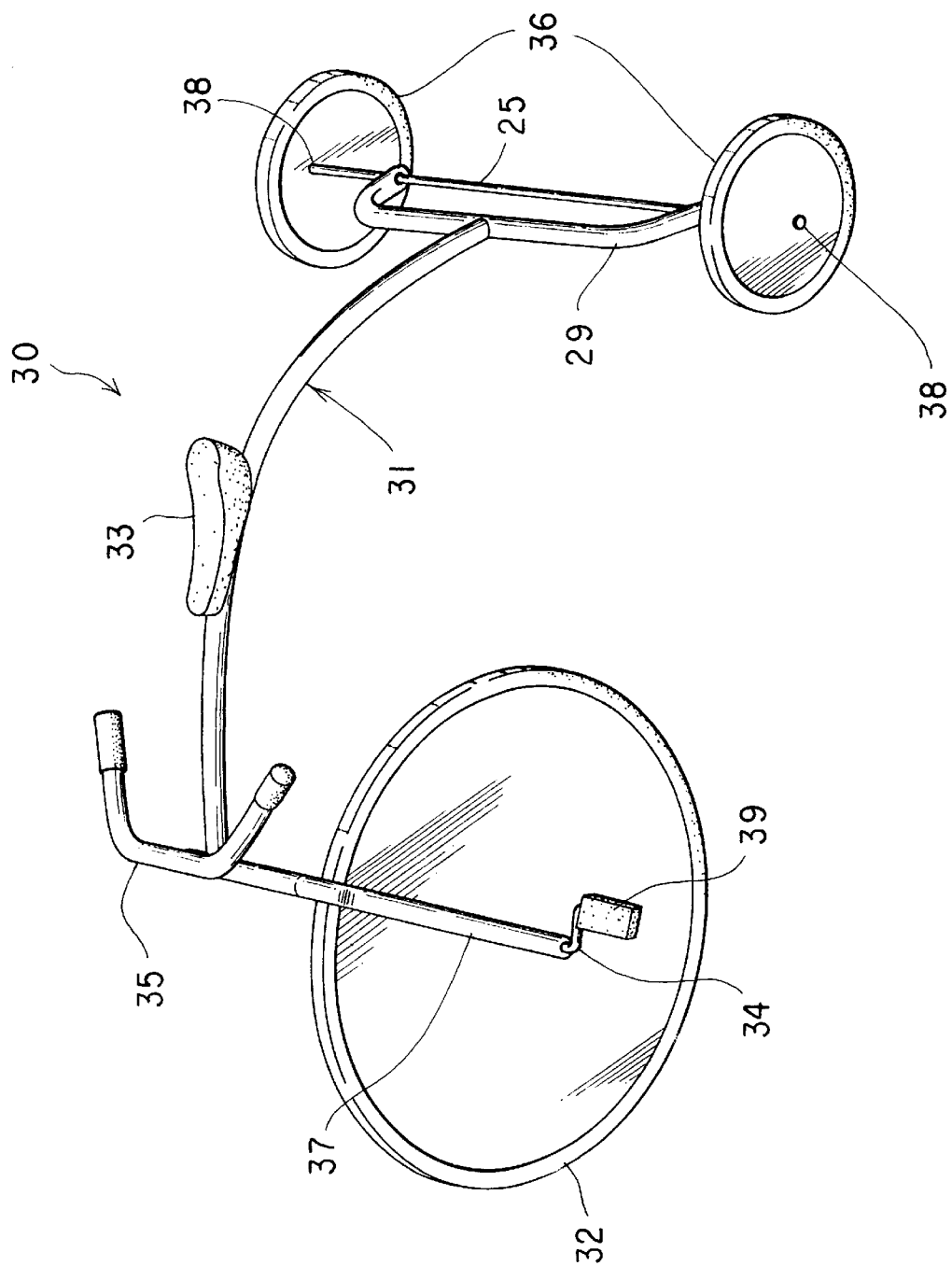
FIG. 2 is a side perspective view of the tricycle embodiment of the present invention.
Figure 3:
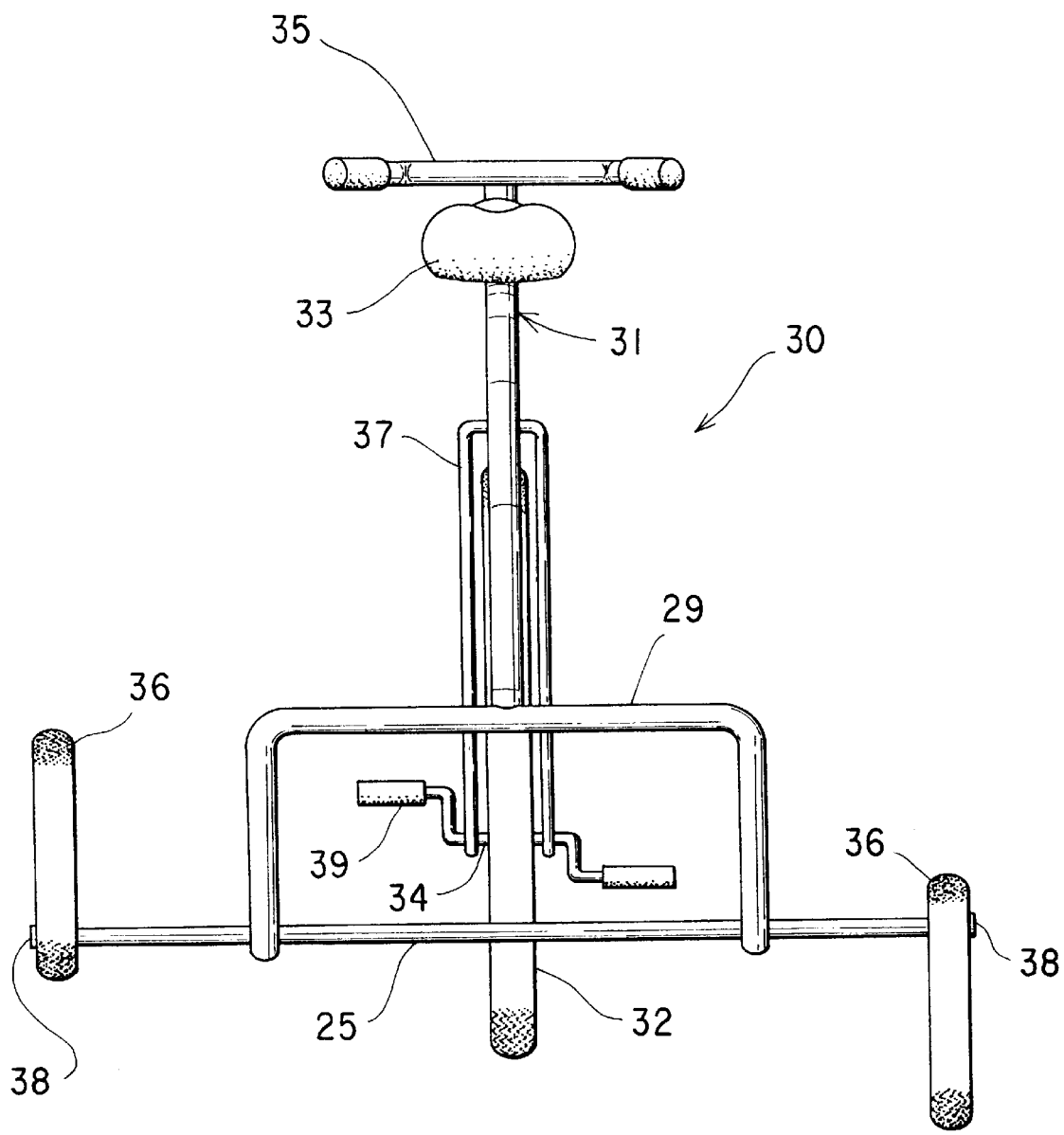
FIG. 3 is a back elevational view of the tricycle embodiment of the present invention.

Now referring to FIGS. 2 and 3, the tricycle embodiment 30 of the present invention features a substantially conventional frame 31, with a seat 33, handlebars 35, a front fork tube 37, a pedal assembly 39 and a bifurcated axle support tube 29. Front fork tube 37 engages a front wheel 32 having a different diameter than that of the back wheels 36. The eccentricity of the hub 34 of wheel 32 also differs from that of the hubs 38 of wheels 36. Furthermore, hubs 38 are arranged on an axle 25 so as to be 180° out of phase relative to each other, as shown in FIG. 3. This arrangement, coupled with eccentrically-mounted axle hub 34 and the disparity in size between wheel 32 and wheels 36, enhances the oscillatory sensation experienced by a rider of tricycle 30, making it an amusing toy for children.

It is to be understood that the present invention is not limited to the embodiments described above, but encompasses any and all embodiments within the scope of the following claims.

I claim:

1. A cycle comprising:
  a frame having a rear axle;
  a first wheel having a center and a diameter, said first wheel including a first axle hub offset by a first offset distance from the center of said first wheel, said first axle hub mounted to said frame;
  a second wheel having a center and a diameter, said second wheel including a second axle hub offset by a second offset distance from the center of said second wheel, said second axle hub mounted to said frame;
  a third wheel having a center and a diameter, said third wheel including a third axle hub offset by a third offset distance from the center of said third wheel, said third wheel mounted to said frame, said second axle hub and said third axle hub both mounted to said rear axle 180 degrees out of phase relative to each other, wherein the diameter of said first wheel is unequal to the diameter of said second wheel and the diameter of said third wheel, and the first offset distance is unequal to the second offset distance and the third offset distance.

2. The tricycle according to claim 1 wherein the diameter of said second wheel is equal to the diameter of said third wheel.

3. The tricycle according to claim 1 wherein the second offset distance is equal to the third offset distance.

\* \* \* \* \*